United States Patent
Kaufman et al.

[11] Patent Number: 5,904,272
[45] Date of Patent: May 18, 1999

[54] DISPENSER FOR LIQUIDS

[75] Inventors: John G. Kaufman, Burlington; Edmond L. Rampen, Oakville, both of Canada

[73] Assignee: Kaufman Products Inc., Oakville, Canada

[21] Appl. No.: 08/968,652

[22] Filed: Nov. 12, 1997

[51] Int. Cl.$^6$ .............. B65D 37/00; B65D 47/00
[52] U.S. Cl. .............. 222/207; 222/211; 222/476; 222/477
[58] Field of Search ............... 222/207, 211, 222/476, 477

[56] References Cited

U.S. PATENT DOCUMENTS

| | | | |
|---|---|---|---|
| 1,995,215 | 3/1935 | Mehlsen et al. | |
| 2,680,010 | 11/1950 | Dubay | 261/124 |
| 3,070,266 | 12/1962 | Chappell | 222/477 |
| 3,146,923 | 9/1964 | Chappell | 222/477 |
| 3,422,993 | 1/1969 | Boehm et al. | 222/190 |
| 3,622,049 | 11/1971 | Thompson | 222/190 |
| 3,709,437 | 1/1973 | Wright | 239/343 |
| 3,766,570 | 10/1973 | Finneran | 222/56 |
| 3,985,271 | 10/1976 | Gardner | 222/190 |
| 4,018,364 | 4/1977 | Wright | 222/190 |
| 4,022,351 | 5/1977 | Wright | 222/145 |
| 4,147,306 | 4/1979 | Bennett | 239/327 |
| 4,184,615 | 1/1980 | Wright | 222/190 |
| 4,324,349 | 4/1982 | Kaufman | 222/207 |
| 4,429,834 | 2/1984 | Ito | 239/327 |
| 4,432,496 | 2/1984 | Ito | 239/327 |
| 4,635,828 | 1/1987 | Kaufman | 222/185 |
| 4,645,097 | 2/1987 | Kaufman | 222/207 |
| 4,673,110 | 6/1987 | Workum | 222/211 |
| 4,957,218 | 9/1990 | Ford, Jr. | 222/1 |
| 5,033,653 | 7/1991 | Kaufman | 222/185 |
| 5,217,147 | 6/1993 | Kaufman | 222/185 |
| 5,259,535 | 11/1993 | Boyte, Sr. | 222/207 |
| 5,427,279 | 6/1995 | Kaufman | 222/207 |
| 5,544,788 | 8/1996 | Meyer | 222/110 |

Primary Examiner—Andres Kashnikow
Assistant Examiner—Keats Quinalty
Attorney, Agent, or Firm—Rogers & Scott

[57] ABSTRACT

A dispenser is provided for liquids which responds to actuation either by squeezing or by some other action to cause dispensing. Liquid is stored in an enclosure and an outlet structure has an outlet passageway which carries liquid from the enclosure to exit outside the dispenser. A buoyant bell combines with the passageway to trap liquid in the enclosure. If preferred, upon actuation liquid will flow initially, and then the bell can be made to seal the outlet structure to stop liquid flow thereby simulating a pumping action.

14 Claims, 2 Drawing Sheets

DISPENSER FOR LIQUIDS

FIELD OF THE INVENTION

This invention relates to dispensers suitable for dispensing small quantities of liquid on demand. More particularly, the invention relates to such dispensers having simple parts which are readily assembled and which can also be arranged to simulate a pumping action.

BACKGROUND OF THE INVENTION

The liquid dispensers for use to dispense liquids such as shampoo, water, condiments, etc. have been developed in various forms. One of these has been developed with no moving parts and relies on the use of negative pressure above a supply of liquid to maintain the liquid ready for dispensing. These dispensers have become known as "Kaufman" dispensers and they respond to a disturbance of the equilibrium within the dispenser to cause liquid to flow. The present invention is a type of Kaufman dispenser having characteristics not found in the prior art.

SUMMARY OF THE INVENTION

A dispenser is provided for liquids which responds to actuation either by squeezing or by some other action to cause dispensing. Liquid is stored in an enclosure and an outlet structure has an outlet passageway which carries liquid from the enclosure to exit outside the dispenser. A buoyant bell combines with the passageway to trap liquid in the enclosure. If preferred, upon actuation, liquid will flow initially, and then the bell can be made to seal the outlet structure to stop liquid flow thereby simulating a pumping action.

Dispensers according to the invention can take numerous forms, some of which will be described in combination with the drawings.

DESCRIPTION OF THE PREFERRED EMBODIMENT(S)

Several embodiments will be described, all of which incorporate the inventive concept. The embodiments are to be preferred for different uses as will be explained.

Figure 1:
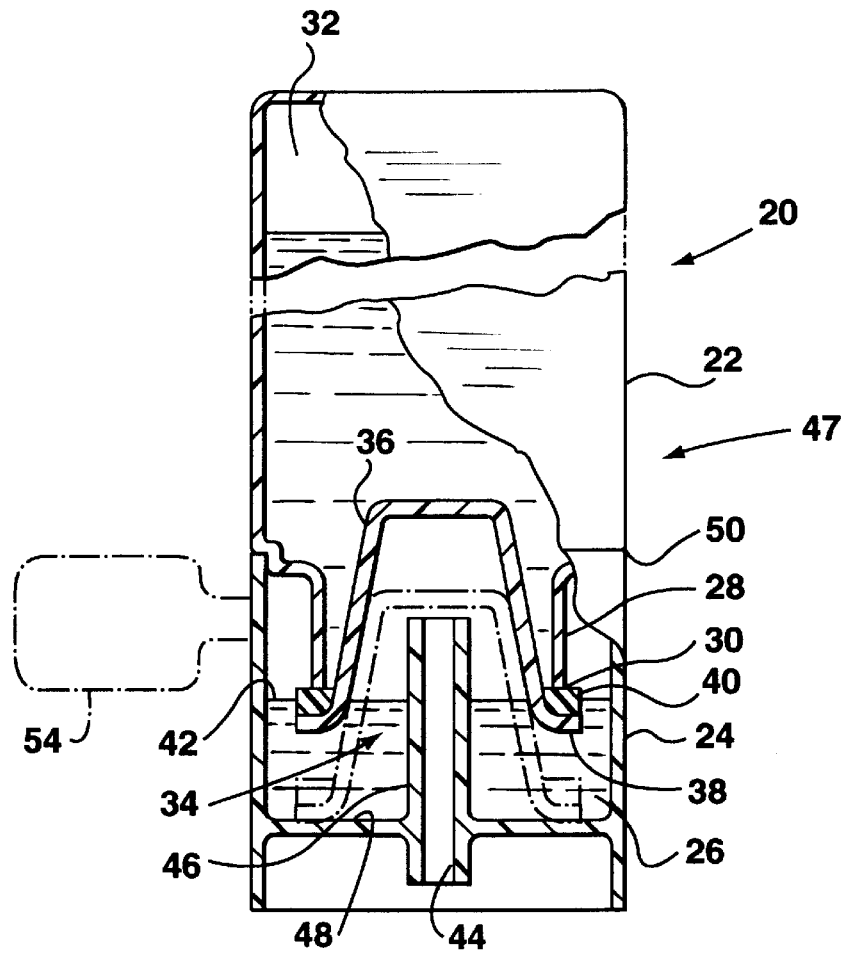
FIG. 1 is a partly sectioned side view of an embodiment of the invention which is to be preferred when dispensing from the bottom of the dispenser, an alternative to the embodiment being shown in ghost outline.

As seen in FIG. 1, a first embodiment is identified as a dispenser designated generally by the numeral 20 and in use for dispensing from the bottom of the dispenser by squeezing a container 22. The container is attached to a reservoir 24 which receives liquid 26 from the container via a neck 28 which leads to a bottom outlet 30 at the lower end of the neck. The liquid is trapped in the container and a negative pressure is developed in space 32 above the liquid. This is conventional in this type of dispenser. outlet structure is designated generally by the numeral 34 and includes a bell 36 located within the neck 28 and having an outwardly extending radial flange 38 attached to a combination flotation and sealing element 40 above the flange. In the position shown, this element is in contact with the bottom outlet 30 of the neck 28 driven there by the buoyancy of the bell in the liquid 26 which has reached a level 42.

The outlet structure also includes a downwardly extending passageway 44 defined by an upstanding tubular portion 46 which is formed integrally with the reservoir 24.

In the position shown in FIG. 1, an equilibrium has been reached within an envelope designated generally by the numeral 47 formed by the container 20 and reservoir 24. Atmospheric pressure will exist in the bell because of the connection to ambient pressure via the passageway 44. The space 32 will be at a sub-atmospheric pressure and there is a possibility of increased pressure above the liquid level 42 about the bell should the temperature increase. This design is not intended to accommodate large increases in pressure caused by temperature fluctuation but nevertheless there will be some temperature fluctuation accommodated because the level within the bell can rise until it reaches the upper limit of the tubular portion 46 before there will be involuntary dispensing. It will be evident from subsequent designs that modifications can be made to accommodate greater temperature compensation if this is required.

The equilibrium condition must be modified to cause dispensing. To accommodate this, the container 22 has resilient walls so that when these are deflected, the equilibrium will be changed and the level within the bell 36 will rise. At the same time, the bell 36 is subjected to differential pressure because the pressure above the bell has been increased and the pressure within the bell remains atmospheric. Consequently, the bell will be driven downwardly against its natural tendency to float until it reaches the position shown in chain-dotted outline. While the bell is being driven downwards, there will be some dispensing action which will be terminated when the bell reaches a floor 48 in the reservoir thereby preventing further flow. Of course if further flow is required, the shape of the bell can be modified where it meets the floor to provide gaps which will permit continued flow.

In some instances it will be desirable to simulate a pumping action, and this structure achieves this because when the bell meets the floor, the flow will end in a similar fashion to the end of the stroke in a pumping action.

Once the user removes pressure from the wall of the container 22, the resiliency of the walls will cause them to return to the position shown in FIG. 1 thereby drawing air inwardly through the passageway 44 to establishing a new equilibrium within the container with the bell returning substantially to its original position due to the buoyancy of the bell in the liquid.

The embodiment shown in FIG. 1 has advantageous characteristics apart from the fact that it is simple to assemble because the loose bell is simply dropped in place. The container 22 can be made and filled and then the reservoir 24 attached at a sealing joint 50 with the bell 36 loosely positioned within the assembly. The resulting envelope contains the bell and the liquid so that when the structure is put in the position shown in FIG. 1, it will find an equilibrium.

To further demonstrate the possible variations in this embodiment, a resilient bulb 54 is shown in ghost outline attached to the reservoir 24. This is intended to demonstrate that the bulb 54 could be used to pump air into the reservoir through the wall of the reservoir and above the liquid thereby changing the equilibrium and causing dispensing. Other variations could be used to modify the equilibrium and cause a similar event.

The structure shown in FIG. 1 is designed to dispense from the bottom. If it is desired to dispense from the side of the envelope near the bottom, a structure such as that shown in FIG. 2 would be preferred. In this case, a container 56 and reservoir 58 combine to form an envelope containing the liquid and an outlet structure 60. The container 56 has a neck 62 with a bottom opening 64 and the neck is offset to one side to make space for a bell 66 which floats on liquid at a level 68. An upstanding tubular portion 70 is integrally formed with the reservoir 58 and defines a passageway 72 which extends initially downwardly and then sideways through a side wall 74 of a downward extension of the reservoir. An insert 76 is provided to define an outlet opening 78 through which liquid will be dispensed.

Figure 2:
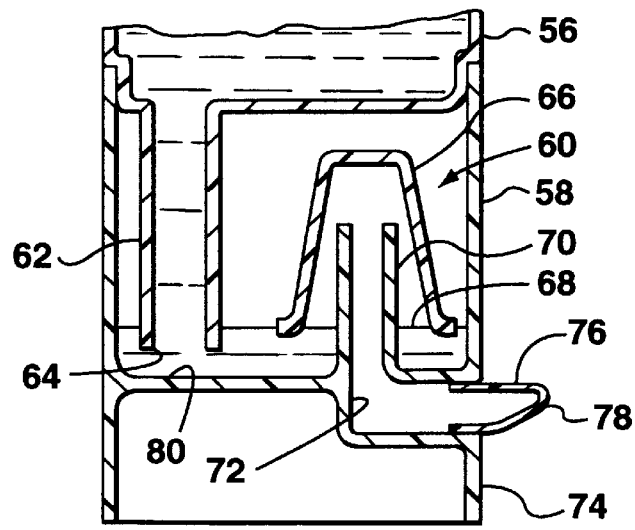
FIG. 2 is a view similar to FIG. 1 and showing part of the dispenser which is to be preferred when dispensing from the side of the dispenser.

The action of the dispenser shown in FIG. 2 is similar to that shown in FIG. 1 in that the container 56 can be resiliently deformed thereby causing a differential pressure with the result that liquid will flow upwardly inside the bell 66 and then downwardly through the passageway 72. At the same time the loose bell is driven downwardly and can be made to seal against a floor 80 of the reservoir if desired.

Assembly of the structure shown in FIG. 2 is simple because the outlet structure 60 is formed partly with the reservoir 58 and has a loose bell 66.

Figure 3:
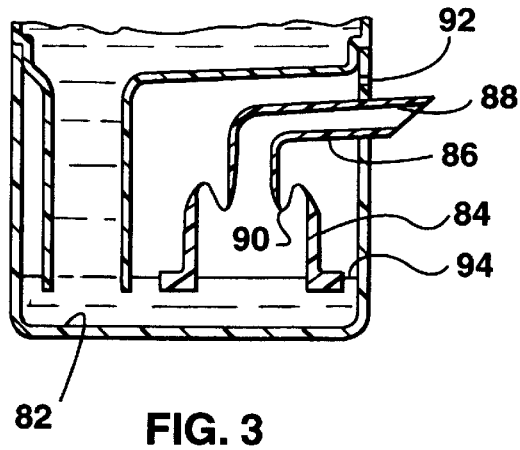
FIG. 3 is a third embodiment illustrating an alternative structure for dispensing from the side.

The structure shown in FIG. 3 is similar to that shown in FIG. 2 but designed to provide a side exit through the reservoir wall above a floor 82. In this case, a modified bell 84 is provided connected to an outlet tube 86 containing a passageway 88 and connected to the modified bell 84 by a very flexible radial bellows structure 90. This structure is relatively limp and will readily permit vertical movement of the bell 84 relative to the outlet tube 86. The result is that when the equilibrium is modified, pressure on the bell 84 will cause it to move downwardly towards the floor 82 and this is permitted by the bellows structure 90. After dispensing, the bell 84 will again float upwardly permitted by the bellows structure to do so.

Although the structure requires a bell that is connected to the reservoir, there is nevertheless some simplicity and also it is possible to provide a simulated pumping action.

The structure in FIG. 3 also illustrates a further possible modification. A very small opening 92 can be provided in the wall of the reservoir so that in the event that temperature causes liquid level 94 to rise, the pressure above the liquid level is equalized to atmosphere through the hole 92 and of course through the passageway 88. Consequently, the level 94 can be allowed to move quite considerably upwards before there would be any likelihood of spillage caused by the temperature change. The exact amount of temperature compensation will depend upon the proportions of the structure. In use, the hole is too small to accommodate significant air flow so the hole is essentially transparent when considering the dispensing action.

It will be evident also that an alternative to the hole 92 could be provided through the wall of the outlet tube 86. In general, it is preferred to provide the hole as high as possible in the structure in order to maximize temperature compensation. Holes of this kind could also be used in all embodiments.

Figure 4:
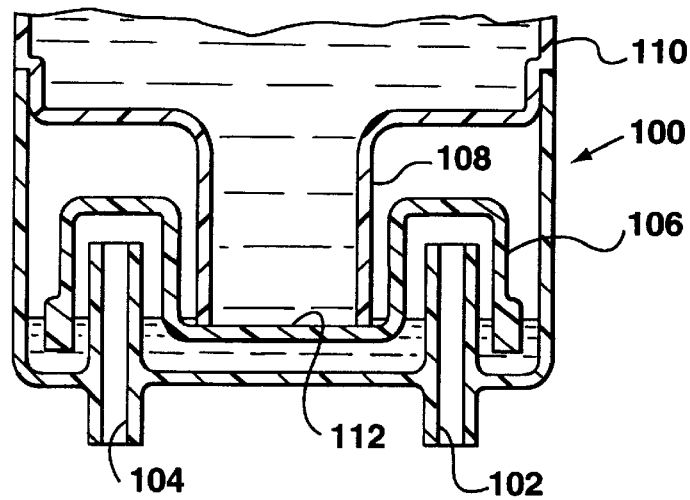
FIG. 4 is a further view similar to part of FIG. 1 and illustrating a dispenser having multiple outlets.

Reference is next made to FIG. 4 which illustrates a dispenser 100 having two outlet passageways 102, 104. A compound bell 106 is annular in shape and extends about a neck 108 of a container 110 having a central portion 112 engaged with the outer end of the neck about a bottom opening in the neck as seen in this figure. The operation is similar to that previously described because when the equilibrium is changed, the bell 106 will be driven downwardly and liquid will be forced through the bell and passageways 102, 104. The structure is to be preferred where multiple outlets would be desirable, and it will be clear that because of the annular nature of the bell, more than two outlets could be used.

Figure 5:
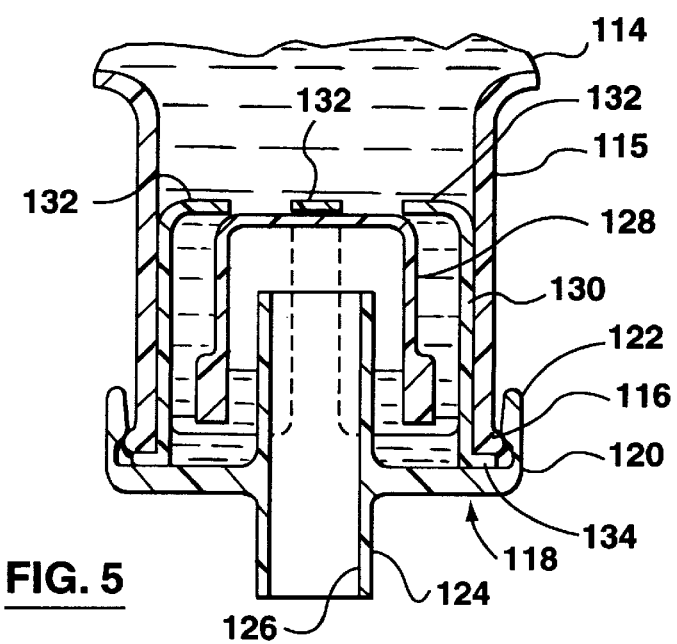
FIG. 5 is a further embodiment of the invention to be preferred as an addition to an existing container to convert it into a dispenser.

Yet another embodiment is shown in FIG. 5 as exemplary of a type of embodiment used simply as an attachment to a container such as a flexible container 114 (such as a bottle) having a neck 115. The neck could take any form and the exemplary neck shown in this figure has an end bead 116 to permit an outlet structure 118 to be snapped in place. This outlet structure includes an end portion 120 having a peripheral rim 122 to snap over the bead 116, and a tubular central portion 124 defining an outlet passageway 126. A loose bell 128 is positioned about the tubular structure 124 and floats in the liquid although restrained from moving upwardly when the bell 128 meets a keeper 130. This keeper is generally annular in shape and includes a plurality of radial fingers 132 to prevent excessive upward movement of the bell. At the lower end the keeper 130 includes an outwardly extending flange 134 which is trapped between the end portion 120 and the end of the neck 115 of the container 110.

The outlet structure 118 shown in FIG. 5 can be preassembled and then snapped onto a suitable container 114 so that there is effectively no reservoir in the sense of those described previously. However, the envelope described in other embodiments is equivalent to an envelope created by the container 110 and the end portion 120 of the structure 118.

These and other embodiments are within the scope of the invention as described and claimed.

We claim:

1. A dispenser for liquids including:

an upright container having a bottom outlet;

a reservoir coupled to the container for receiving liquid from the container, the outlet being contained in the reservoir so that liquid flowing from the container will contain the outlet and reach a liquid level in the reservoir, the container and the reservoir combining to form an enclosure;

an outlet structure coupled to the enclosure, the structure defining an outlet passageway and having a buoyant bell adapted to float on the liquid above said liquid level, the outlet passageway extending from within the bell to outside the enclosure; and the enclosure including means for changing the equilibrium in the enclosure to increase the pressure on the liquid and outside the bell in the reservoir, whereby liquid will exit from the passageway and the bell will move contemporaneously downwardly under the influence of the pressure outside the bell in the reservoir.

2. A dispenser as claimed in claim 1 in which the reservoir includes a floor so that when the bell is moved downwardly the ball meets the floor to prevent further liquid flow through the passageway thereby simulating a pumping action.

3. A dispenser as claimed in claim 1 in which the passageway extends downwardly from within the bell.

4. A dispenser as claimed in claim 3 in which the reservoir has a side wall and in which the passageway terminates at an outlet in the side wall of the reservoir.

5. A dispenser as claimed in claim 1 in which the passageway extends upwardly from the bell and in which the bell is loosely coupled to the outlet structure forming the passageway to permit vertical movement of the bell relative to the outlet structure.

6. A dispenser as claimed in claim 5 in which the reservoir has a side wall and in which the passageway terminates at an outlet in the side wall of the reservoir.

7. A dispenser as claimed in claim 1 in which the container includes a neck and the bottom outlet is formed by the neck.

8. A dispenser as claimed in claim 7 in which the neck and the bell are spaced apart vertically.

9. A dispenser as claimed in claim 7 in which the bell is annular and the bell is positioned about the neck.

10. A dispenser as claimed in claim 1 in which the bell defines a small air opening positioned to permit pressure variations in the reservoir to vent through the bell and the outlet passageway to compensate for temperature fluctuations.

11. A dispenser for liquids including:

an enclosure for containing the liquid, an outlet structure coupled to the enclosure, the structure defining an outlet passageway and having a buoyant bell adapted to float on the liquid above said liquid level, the outlet passageway extending from within the bell to outside the enclosure, and the enclosure including means for changing the equilibrium in the enclosure whereby liquid will exit from the passageway and the bell will move contemporaneously downwardly under the influence of pressure outside the bell.

12. A dispenser as claimed in claim 11 in which the enclosure defines a floor and the bell meets the floor after dispensing the liquid to seal the outlet structure thereby preventing further flow of liquid through the passageway to simulate a pumping action.

13. A dispenser as claimed in claim 11 and further including a keeper coupled to the enclosure and positioned to limit upward movement of the buoyant bell in the liquid.

14. A dispenser as claimed in claim 13 in which an envelope defines a floor and the bell meets the floor after dispensing the liquid to seal the outlet structure thereby preventing further flow of liquid through the passageway to simulate a pumping action.

* * * * *